May 19, 1964 C. BATTAREL 3,134,025

BINARY LOGIC CIRCUITS

Filed Sept. 19, 1960 2 Sheets-Sheet 1

INVENTOR.
CLAUDE BATTAREL

BY Ronald J. Kransdorf

AGENT

May 19, 1964 | C. BATTAREL | 3,134,025

BINARY LOGIC CIRCUITS

Filed Sept. 19, 1960

2 Sheets-Sheet 2

United States Patent Office 3,134,025
Patented May 19, 1964

3,134,025
BINARY LOGIC CIRCUITS
Claude Battarel, Paris, France, assignor to International Business Machines Corporation, New York, N.Y., a corporation of New York
Filed Sept. 19, 1960, Ser. No. 56,852
7 Claims. (Cl. 307—88)

This invention relates to data processing circuits and more particularly to a two-state circuit which may be used alone to perform a logical operation and to store the result thereof, or which may be used in multiple to form a shift register or a counter.

The circuitry of this invention is an improvement on that shown in copending application Serial Number 9,242, filed by S. Francey and J. Albin, February 17, 1960, and now U.S. Patent No. 3,078,446. The objects of this improvement are as follows:

To provide a two-state storage circuit of the type described in the above-mentioned copending application from which information may be non-destructively read out and which, in fact, will supply a continuous A.-C. output signal or a continuous D.-C. output signal of either polarity when the circuit is in an "ON" state.

To provide a circuit of the type mentioned above, the state of which may be controlled by one or more of a plurality of input signals of either polarity and variable amplitude whereby the circuit may be switched in response to any desired logical function.

To provide a novel ring circuit to which drive pulses may be directly applied.

To provide a counter the number base of which may be easily switched from one system to another.

To provide, in a counter, novel means for giving a visual indication of the numbers stored in the counter at any given time.

In accordance with these objects this invention utilizes a pair of bistable magnetic cores each linked by a first and a second winding in much the same way as these elements are used in the beforementioned copending application. The present circuit differs from that of the copending application in that the A.-C. drive signal may be applied continuously through the first pair of windings to the load when the circuit is in its "ON" state without turning the circuit off. This results from the fact that the load circuit includes means for generating a positive output signal and a negative output signal when the circuit is in its "ON" state and that the positive output signal is fed back to the pair of control windings (the second windings) to maintain the unbalance between the cores.

The present circuit also differs in that it provides a plurality of input lines by which signals of either polarity and variable amplitude may be impressed on the control windings. A negative signal applied to one of the inputs when the circuit is in its "ON" state will cancel the effect of the feedback signal and in this way turn the circuit off. A positive signal applied to an input when the circuit is in its "ON" state or a negative signal applied when the circuit is in its "OFF" state will inhibit the switching of the circuit by the impression of a signal of opposite polarity on another terminal. And the circuit may also be switched in response to two or more input signals of less than full amplitude. The circuit may therefore be made to switch in response to any desired logical input function.

A plurality of the above-described circuits may be combined to form a shift register by connecting the negative D.-C. output from each circuit to an input of each other circuit of the register except the circuit next succeeding it. Positive drive signals applied simultaneously to all the circuits would then cause information to be stepped along. One, two, or more of these shift registers may be combined to form a counter having any desired numerical base by initially setting the first circuit of each register to its "ON" state and then using an output from the last circuit of the first register to condition a gate to pass the pulses to be counted to be applied in parallel to all the circuits of a second register. In this way, one circuit of each register will be in its "ON" state after any given number of pulses to be counted. An output is derived from this counter by determining which circuits will be in their "ON" state when the desired number of pulses have occurred, and connecting their outputs through an AND gate to the output line. Means would also be provided to reset the counter to its initial condition when the above determined circuits are in their "ON" state. Lamps associated with each circuit are connected in matrix form to give an indication of the number stored in the counter at any given time.

The foregoing and other objects, features and advantages of the invention will be apparent from the following more particular description of preferred embodiments of the invention, as illustrated in the accompanying drawings.

Figure 1:
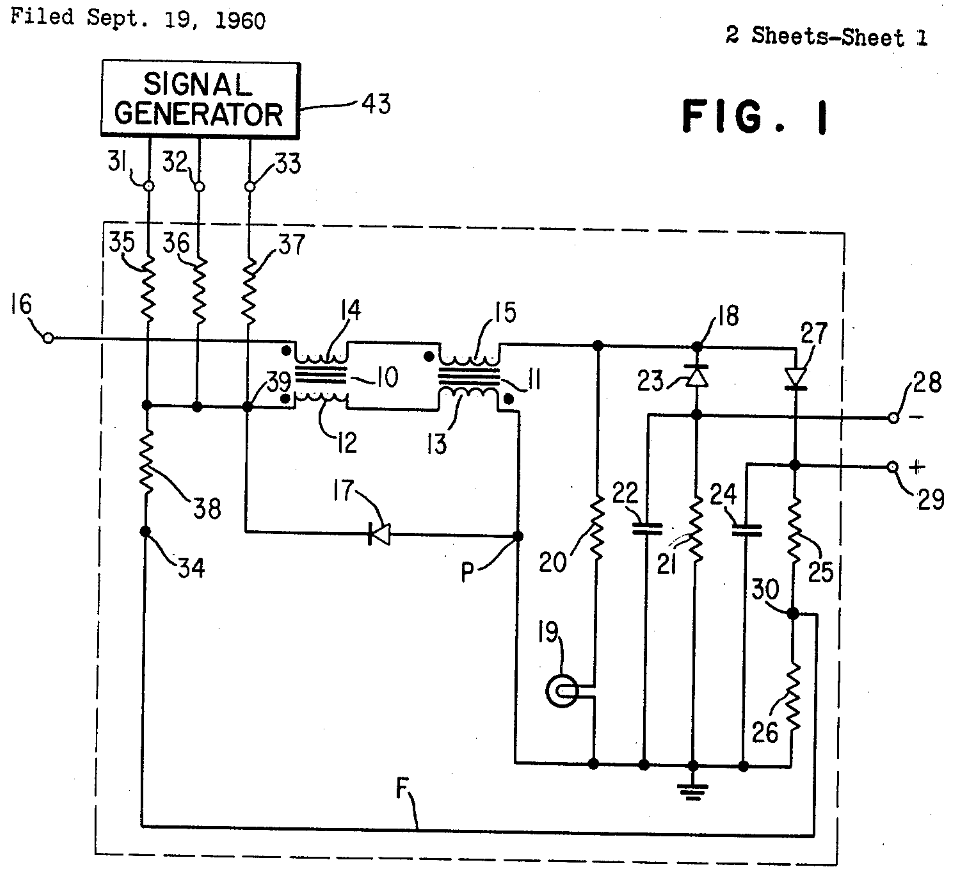
FIG. 1 is a circuit diagram of a two-state storage circuit which is a preferred embodiment of the basic component of this invention.

The two-state circuit shown in FIG. 1 is, in general, similar to that shown in the before-mentioned copending application. The circuit has two identical magnetic cores 10 and 11 each having a substantially rectangular hysteresis curve. Each of these cores supports a control winding 12, 13 and a feed winding 14, 15. The feed windings 14, 15 are serially connected and are shown as being coiled in the same direction on both cores so that a current passing through these windings will cause both cores to be switched in the same direction. The control windings 12, 13 are likewise serially connected, but are coiled in opposite directions.

A sinusoidal or rectangular A.-C. feeding voltage having a high frequency, for example around ten kilocycles, is applied through terminal 16 to the series connected feed windings 14 and 15. A diode 17 is connected across the two control windings 12 and 13, the point P at the junction of the positive electrode of diode 17 and one end of the winding 13 being connected directly to ground.

A load circuit is connected in series with the feed windings 14 and 15, the load being connected between terminal 18 and ground. In FIG. 1, the load is shown as being made up of three parallel legs:

(1) The series combination of a resistance 20 and a lamp 19 of any type, for example a glow lamp, for indicating the state of the circuit.

(2) A diode 23 having a parallel combination of resistor 21 and capacitor 22 connected to the anode thereof.

(3) A diode 27 having series resistors 25 and 26 connected to the cathode thereof and capacitor 24 connected across the resistors.

The circuit also has a plurality of output terminals 28, 29, 30 and a plurality of input terminals 31, 32, 33 and 34. A feedback line F connects output terminal 30 to input terminal 34.

The circuit of FIG. 1 may assume two distinct stable balanced states, the first being characterized by a remanent flux in both cores of the same direction, and being designated the "OFF" state and the second being characterized by a remanent flux in the two cores of opposite direction and being designated the "ON" state.

The operation of this circuit can best be understood by looking at the following examples:

(1) Let it be assumed that the circuit is in its "OFF" state and that no positive control signal is applied to any of the input terminals 31 through 33. Under the action of the A.-C. feeding voltage applied to terminal 16, the remanent flux states in the two cores vary equally, each completely traversing its hysteresis loop. Both cores operate as transformers, the feed windings 14 and 15 operating as primary windings and the control windings 12 and 13 operating as secondary windings. Since the cores are being identically driven, the voltages induced in the windings 12 and 13 are equal, and since these windings are wound to oppose each other, the induced currents are opposite. Therefore, no current flows through the secondary windings and the resistance applied to the feed windings 14 and 15 is very high. Due to this high impedance condition nearly the entire driving voltage applied to the terminal 16 is dissipated in the feed windings 14 and 15 and no current flows to cause a potential drop across the load circuit.

(2) A signal applied to one of the input terminals 31–34 will be applied in parallel to diode 17 and to control windings 12, 13. A negative input pulse will forward bias the diode and will be short circuited therethrough to ground. A positive input pulse will, however, back bias the diode 17 causing it to present a high impedance. A positive input pulse will, therefore, pass through the oppositely coiled control windings 12 and 13 causing fluxes which tend to drive the cores in opposite directions. The alternation of the A.-C. signal then being applied to terminal 16 would at the same time be causing fluxes which tend to drive both cores in the same direction. The two fluxes appearing in one of the cores would be in opposite directions and would cancel leaving that core in its existing state, while in the other core the fluxes would be in the same direction and would switch the core. The circuit is in this way switched to its "ON" state.

Assume that the states of the two cores are such that, when the control signal is removed, the first positive alternation of the A.-C. feeding voltage applied to terminal 16 generates a magnetic flux which, in core 10, is in phase with that generated by the control signal and, in core 11, is in opposition therewith. Therefore, core 10 is driven further into saturation during the whole of the positive alternation of the first oscillation, whereas core 11 undergoes a flux variation: it starts traversing its hysteresis loop toward positive saturation and operates as a transformer. The voltage induced in the control winding 13 by this transformer action is of such polarity as to forward bias diode 17. Diode 17 and control winding 12 of positively saturated core 10 provide a very low impedance for winding 13, causing core 11 to operate as a nearly short circuit transformer during the whole period $$\left(\frac{T}{2}\right)$$

(T being the period of the high frequency oscillations at terminal 16). While core 11 is operating in this manner, the feed winding 15 also presents a low impedance. Since both of the feed windings are in low impedance condition at this time, substantially all of the feed voltage appears across the load. Because of the nearly short circuit condition of its secondary core 11 will traverse its hysteresis loop at a very slow rate, and only a small amount of flux will be switched during the time $$\frac{T}{2}$$

During the negative alternation of the first oscillation, the generated magnetic flux is in phase with that of core 11 and in opposition with that of core 10. For a time $t_1$ core 11 is switching back to negative saturation, and during that time both cores traverse their hysteresis loops, operating as transformers with opposite control windings so that the same high impedance condition exists as existed when the circuit was in its "OFF" state. However, from the time $t_1$ at which core 11 reaches negative saturation up to the end of the negative alternation, i.e., during a time $$\left(\frac{T}{2}-t_1\right)$$

only core 10 acts as a transformer. Diode 17 is again forward biased to provide a low impedance secondary circuit similar to that noted for the positive alternation. Current is, therefore, flowing in the load circuit during the time $$\left(\frac{T}{2}-t_1\right)$$

of the first negative alternation.

Since during the time $t_1$ of the first negative alternation the secondary circuit is in its high impedance condition, the core 10 is traversing its hysteresis loop quickly and therefore a larger amount of flux is switched during this alternation than was switched during the one preceding it. During the positive alternation of the following oscillation, the phenomenon is repeated, but the function of the cores 10 and 11 is once more inverted. No signal appears at the load terminal 18 during a time $t_2$ until core 10 is again saturated positively, the time $t_2$ being greater than $t_1$ since core 10 has switched more flux than did core 11 on the previous alternation; then during the remaining part of the alternation, i.e., during time $$\left(\frac{T}{2}-t_2\right)$$

there is a potential drop across the load. This cycle is repeated, a signal appearing at terminal 18 during progressively decreasing times:

$$\frac{T}{2}, \left(\frac{T}{2}-t_1\right), \left(\frac{T}{2}-t_2\right), \left(\frac{T}{2}-t_3\right) \ldots$$

where T is the period of the high frequency oscillations at terminal 16, and the progressively increasing times $t_1$, $t_2$, $t_3$ . . . represent the times necessary for core 10 or 11 to reach saturation. The relationship of the various voltages is shown in FIG. 2 with the dotted lines representing the feed voltage at terminal 16 and the solid lines representing the potential appearing across the load when the circuit is in its "ON" state.

The signal appearing at terminal 18 when the circuit is in its "ON" state is applied to perform a number of functions in the load circuit. Part of the signal is applied across resistor 20 and lamp 19, to light the lamp giving a visual indication of the state of the circuit. When the circuit is in its "OFF" state the lamp is also off. Diode 23 gates the negative alternations of the feed signal through the resistor 21 and capacitor 22 to ground. The time constant of the resistor-capacitor circuit is such that a fairly uniform negative D.-C. output is maintained at terminal 28. Likewise, diode 27 gates the positive alternations of the signal through resistors 25 and 26 and through capacitor 24 to ground. Here too, the time constant of the circuit is such that fairly uniform positive D.-C. output signals are maintained at terminals 29 and 30. A fourth load leg having only a resistor could be supplied and the potential drop across this resistor tapped off to obtain an A.-C. output signal if such is desired.

The positive output terminal 30 is connected to one of the input terminals 34 allowing a positive level to be applied through resistor 38 to common point 39 between diode 17 and winding 12 of core 10. This connection allows a positive feedback signal to be applied to the control windings 12 and 13 to maintain the unbalance between the two magnetic cores. As noted before, a signal is applied to terminal 18 for progressively decreasing intervals with each succeeding alternation of the feeding signal from terminal 16. If this were to continue, by the *n*th alternation the circuit would be restored to its "OFF" state. The positive feedback signal acts with the drive signals in much the same way as the control signal did to maintain the unbalance of the cores and in this way to lock the circuit in its "ON" state; with the feedback signal the duration of the signal appearing at terminal 18 for the *n*th pulse and for each succeeding pulse thereafter is $$\left(\frac{T}{2}-t_n\right)$$

Figure 2:
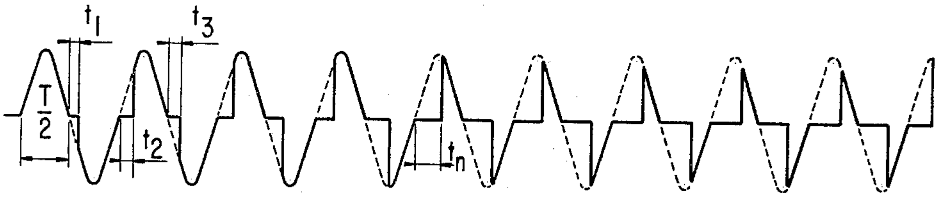
FIG. 2 is a voltage diagram of the output signal appearing across the load circuit of FIG. 1 when the circuit is in its "ON" state.

(See FIG. 2.)

In addition to the feedback input terminal 34, the circuit also has three input terminals 31, 32, and 33, which are connected through respective resistors 35, 36 and 37 to common input point 39. Pulses of either polarity and of variable amplitude generated by any suitable means (for example by externally controlled signal generator 43) may be applied to these input terminals to control the "ON"-"OFF" state of the circuit. For example, as previously noted, a positive pulse applied to one of the input terminals when the circuit is in its "OFF" state will switch the circuit on. Conversely, a negative pulse applied to one of the input terminals when the circuit is in its "ON" state will effectively cancel the effect of the feedback voltage at the common terminal 39; and, since, as previously noted, the unbalanced condition of the circuit cannot be maintained without this feedback voltage, the negative input signal will switch the circuit off.

It can now be seen that when the circuit is in its "OFF" state a positive potential of a particular current level is required at the common point 39 to switch the circuit on and when the circuit is in its "ON" state a positive potential of a similar current level is necessary at the terminal 39 to maintain the circuit in its "ON" state. Therefore, if the circuit is in its "OFF" state, a negative potential applied to one of the input terminals will prevent the circuit from being turned on by a positive signal being applied to any one of the other terminals. Likewise, a positive signal applied to one of the input terminals when the circuit is in its "ON" state will inhibit the turning off of the circuit by a negative signal applied to any one of the other terminals. Similarly, by using input signals of less than full amplitude, the circuit may be made to switch to its "ON" state in response to the presence of two or more input signals.

From the above, it is apparent that the two-state circuit of this invention may be used to perform any logical operation among several possible operations. For example, a two-state circuit with three input terminals 31, 32, 33, to which there may be applied, or not, three positive pulses $x$, $y$, and $z$ makes a logical OR circuit realizing the logical function $(x+y+z)$, (i.e. it starts operating only if one of the three input terminals, two of them or the three of them are energized). Similarly, if the pulses $x$, $y$, and $z$ are of less than full amplitude a logical AND circuit having the function $(x, y, z)$ is realized. Throughout the text, the symbol "." will indicate the logical AND function, the symbol "+" the OR function, and an overline the NOT function.

In the case where signal $x$ applied to one input terminal is positive, whereas signals $y$ and $z$ applied to the other input terminals are negative, the circuit turns on if the presence of signal $x$ coincides with the simultaneous absence of signals $y$ and $z$. The logical function realized then is: $x.(\overline{y+z})$. The presence of one of the negative voltages $y$ or $z$ is sufficient to lock the circuit in its "OFF" state.

It is quite obvious that the number of input terminals of the logical circuit has been selected arbitrarily to be three as an example, and that it might easily be modified.

In the illustrative counters which will be described later on, only function $x.(\overline{y+z})$ will be used, (or function $x.y$ when using two input terminals). But it is quite obvious that if an application of the above-described circuit should require a different logical input function, it could easily be provided.

Logical circuits made up of these two state circuits have the important advantage that once they are on, they remain on even after the interruption of the input signals. They, therefore, store the result of a performed logical operation and also continuously provide a variety of output signals for indicating said result.

An alternative embodiment of this two-state circuit may be realized by reversing the connections on the diode 17, that is, by connecting the anode to point 39 and the cathode to point T. The diode 17 would then act as a short circuit path to ground for positive input signals preventing them from having any switching effect on the cores 10 and 11. Negative input pulses would, however, back bias the diode and would pass through the windings 12 and 13 to switch the circuit to its "ON" state. With this embodiment, a negative feedback signal would be required to maintain the circuit in its "ON" state. The feedback signal would, therefore, be derived from terminal 28 or from some other point in the line between diode 23 and ground. On the other hand, a blocking voltage in this embodiment or the voltage to reset the circuit would be positive. Through a simple analogy, all properties and characteristics of the circuit of this alternative embodiment may be deduced from the circuit having the diode 17 connected as shown in FIG. 1.

Figure 3:
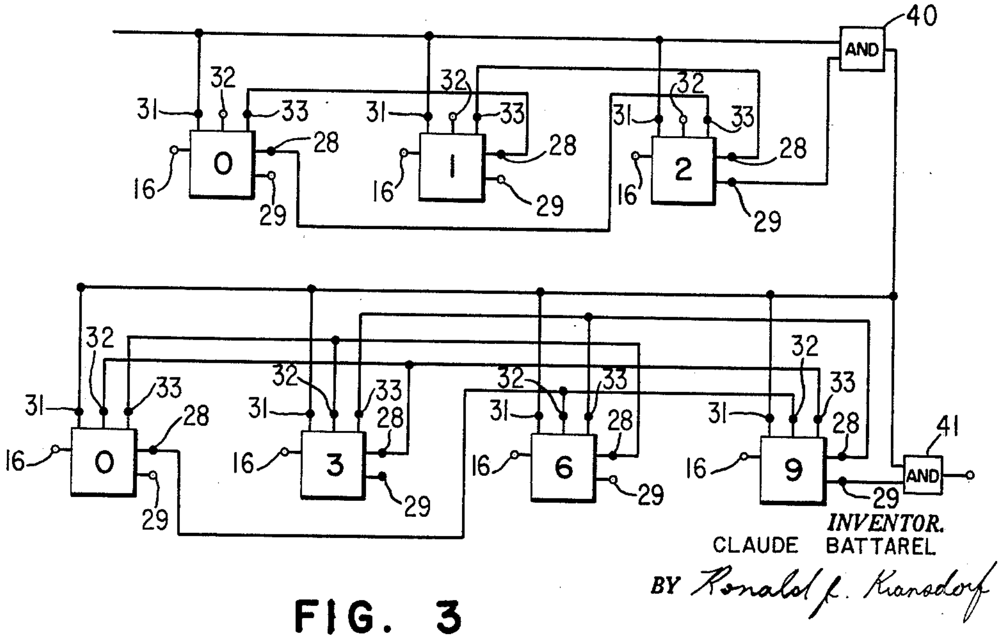
FIGS. 3 and 4 are respectively block diagram representations of a duodecimal counter and a decimal counter using the basic two-state circuit shown in FIG. 1.

FIG. 3 is a block diagram representation of a duodecimal counter formed by combining two cascaded shift registers. Both ring circuit shift registers comprise stages similar to the two-state circuit shown in FIG. 1.

To simplify the drawing, each of the two-state circuits is represented by a square which is in accordance with the squares shown by dash lines in FIG. 1. Each square has six terminals emanating from it, the four input terminals 16, 31, 32, and 33, and two output terminals 28 and 29, these terminals corresponding to those shown in FIG. 1. The A.-C. feeding voltage is applied to terminal 16, the control pulses or the pulses to be counted to terminal 31, and the negative blocking pulses to terminal 32 or 33; a negative output signal is derived from terminal 28 and a positive output signal from terminal 29 when the associated circuit is in its "ON" state.

The A.-C. feeding voltage is applied continuously to the terminals 16 of all stages of the two rings (not to encumber the drawing, this connection has not been represented). The first ring is made up of three stages designated 0, 1 and 2, the second of four stages designated 0, 3, 6 and 9. The pulses to be counted, the control pulses, are applied simultaneously to all the terminals 31 of the first ring. The negative output terminal 28 of each stage of the ring is connected to one of the input terminals of each other stage of the ring, except the input terminal of the stage next succeeding it. Therefore, in the first ring, output terminal 28 of state 0 is connected to input terminal 33 of stage 2, the negative output of stage 1 to an input of stage 0 and the negative output of stage 2 to an input of stage 1; in other words, each stage is connected to the one next preceding it. In the second ring, the negative output terminal 28 of each stage is connected to the input terminal 32 or 33 of the two preceding stages. The negative output terminal 28 of 0 is therefore connected to an input terminal of stages 6 and 9, the negative output of 3 to inputs of 0 and 9, the negative output of 6 to inputs of 3 and 0, and the negative output of 9 to inputs of 3 and 6. These connections are used to block the preceding stage or stages so that a positive pulse applied in parallel to the terminals 31 of a ring can switch on but one stage, the stage following that which is presently on, this being the only stage which is not blocked at that time. As soon as a new stage is switched on, it generates a negative output voltage which is applied to the preceding stage to switch it off. This reset signal will not be effective to turn the preceding stage off until the input signal has ceased since until that time the net potential at terminal 39 is still positive. A logical AND circuit 40 is connected so as to have one of its input terminals pulsed by the positive output of stage 2, and the other input terminal receives pulses from the input line. The output pulse from AND gate 40 is applied in parallel to input terminal 31 of each of the stages 0, 3, 6 and 9 of the second ring and to one of the inputs of a second logical AND circuit 41. The other input for the gate 41 is derived from the positive output terminal 29 of stage 9. The output signal from the duodecimal counter of FIG. 3 is derived from gate 41.

At the beginning of a counting operation the two rings are set to an initial condition with both 0 stages in the "ON" state and all other stages in the "OFF" state. This may be accomplished by stepping the counter along until it is in the desired state, or external means may be provided for initially setting the counter by applying positive signals to one input terminal of each zero stage and negative signals to an input terminal of each other stage. The first control pulse is applied to turn on stage 1, the only stage which is not at that time blocked; this stage acts through its output terminal 28 to reset stage 0. The second input pulse energizes stage 2, which in turn resets stage 1. In the three-stage first ring, the third pulse switches on stage 0 which in turn resets stage 2. This third pulse is also transmitted through AND gate 40 which is at this time conditioned by the positive output signal being derived from terminal 29 of stage 2, and is applied in parallel to input terminal 31 of each stage of the second ring. The three stages is the only one which is not inhibited by a negative pulse at this time, and this stage is, therefore, switched to its "ON" state. The negative output derived from terminal 28 of stage 3 is fed back to turn off the previously on 0 stage. Thus, after three input pulses, the second ring has been advanced one step and the first ring has been returned to its starting state.

It is, therefore, seen that each input pulse makes the first ring advance by one step, and each set of three input pulses resets the first ring to its initial state and makes the second ring advance one step. After each number of pulses, one single stage in each of the rings will be on, the sum of the digits designating the on stages being equal to the number of applied pulses. Thus, for example, if five pulses are applied, stage 2 of the first ring and stage 3 of the second ring would be on. When the eleventh pulse is applied stages 2 and 9 are on. When the twelfth pulse appears on the input line, gates 40 and 41 are both conditioned by respective output signals from terminals 29 of stages 2 and 9. The twelfth pulse, therefore, is able to turn on stage 0 of the first ring which in turn turns off stage 2, is able to pass through gate 40 to turn on stage 0 of the second ring, turning off stage 9, and is able to pass through gate 41 to generate an output signal. The twelfth pulse, thus resets the duodecimal counter to its initial condition with the two 0 stages in their "ON" state and all other stages in their "OFF" state. It also causes an output signal to be generated which may be used in any desired manner, for example, as a carry to energize a higher order counter.

Figure 4:
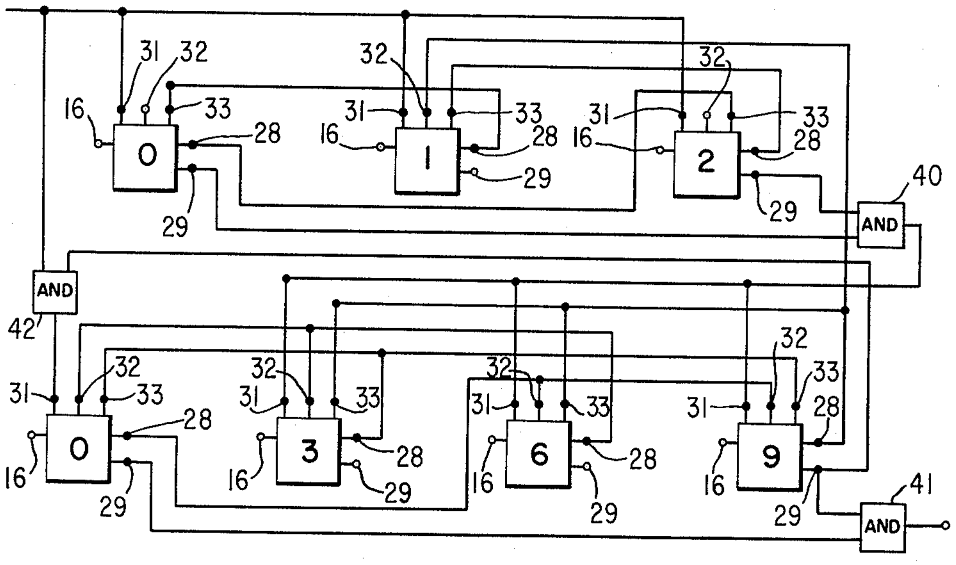

FIG. 4 shows a decimal counter constructed, as is the duodecimal counter of FIG. 3, by combining two rings, a three-stage ring, 0, 1, and 2, and a four-stage ring, 0, 3, 6 and 9. The circuit is similar to the one previously described differing mainly in the connection of the gates 40 and 41. As in the previous circuit, a negative voltage appearing on an output terminal 28 of a stage is applied to an input terminal of each other stage or stages of the same ring except that of the following stage. This next succeeding stage is, therefore, the only one which does not have a switch-inhibit signal applied to it and is therefore, the only one which can be switched when an input signal is applied to the ring.

Before the start of a counting operation, the decimal counter is set to its initial condition with the two 0 stages in the "ON" state and all other stages in the "OFF" state. This setting to an initial condition is accomplished in the same way as for the duodecimal counter. As before, each control pulse, pulse to be counted, causes the first ring to be advanced one stage. Each set of three pulses brings the first ring back to zero and generates a signal at the output of logical AND circuit 40 which is applied in parallel to input terminals 31 of the stages 3, 6 and 9 of the second ring to advance this ring one stage. For the sake of illustrating the versatility of the circuits of this invention, the AND gate 40 of FIG. 4 has been activated in a slightly different manner from that of FIG. 3. As was noted before, when an input signal causes one stage of a ring to be turned on, this stage generates a negative output signal which is applied to the preceding stage to turn it off. However, for reasons already considered, this reset signal is not effective to turn the preceding stage off until the control signal has ceased. Therefore, during each input pulse two stages of the first ring will actually be in the "ON" state, and the positive outputs from these two stages may be applied to an AND gate as is done in FIG. 4 to derive an output signal indicating the number of the pulse being counted.

Up to the eighth control pulse, for which stages 2 and 6 are on, the advance of the decimal counter is identical to that of the duodecimal counter. The ninth pulse switches on the 0 stage of the first ring, causes a signal to appear at the output of logical AND circuit 40 and resets stage 2 of the first ring. The signal at the output of AND circuit 40 advances the second ring from stage 6 to stage 9. The negative output signal from terminal 28 of stage 9 is applied to input terminal 32 of stage 1 to inhibit the switching of this stage by the tenth input pulse and the positive output from terminal 29 of stage 9 is applied to condition AND gates 41 and 42. The tenth input pulse, therefore, (*a*) finds stage 1 inhibited by the output from stage 9 and stage 2 inhibited by the output from stage zero so that it cannot advance the first ring and leaves this ring with its 0 state on; and (*b*) finds gate 42 conditioned by the positive output from stage 9 and passes through this gate to an input terminal of the 0 stage of the second ring to turn that stage on. The positive voltage appearing at the output terminal 29 of stage zero is applied to the second input terminal of conditioned gate 41. Since the resetting of stage 9 by the negative output from terminal 28 of stage 0 is not instantaneous but instead proceeds during several cycles of the feed signal, gate 41 will remain conditioned to pass signals from stage 0 for a few cycles. AND gate 41 is therefore able to generate an output signal indicating that ten pulses have been applied to the counter. This signal may be used as a carry to energize a next higher order counter or for any other desired purpose.

In the above described circuit, the only time that the 0 stage of the second ring is not either on or inhibited is on the tenth control pulse. Therefore, the circuit may be modified by eliminating gate 42 and connecting the control line directly to terminal 31 of the second 0 stage.

The tenth control pulse applied to the counter is, therefore, used to generate an output signal and to restore the two rings to their initial condition. It can now be seen that with this type of counter circuit there are three ways in which an output signal may be obtained. The first way makes use of the fact that for many of the input pulses a stage of a ring will be on and there will be an input pulse on the feed line for the ring. The positive output from the on stage and the input line of that stage could be used as the inputs to an AND circuit, the output of which would be the desired outputs signal. The second method makes use of the fact that for any given number of pulses one stage in each ring will be in its "ON" state. The positive outputs from these on stages may be used as inputs to an AND circuit, the output of which would be the desired output signal. The third method makes use of the fact that for as long as a control signal is applied to the previously on stage of a particular ring, or for infinite number of cycles after a reset signal has been applied to the previously on stage of a particular ring, two stages of that ring will be in their on state. The positive outputs from these two stages may be used as inputs to an AND circuit to derive the desired output signal.

There are also several methods of resetting the rings to their initial condition after an output signal has been derived. The simplest of these methods is that shown in FIG. 3 where the circuit has been designed to have the rings stepped to their initial condition when an output is derived. Other methods involve gating positive output signals from on stages to reset other stages in a manner somewhat similar to that described above or applying negative outputs from on stages to inhibit the switching on of other stages in response to control signals.

In FIGS. 3 and 4, the same combination of seven two-state circuits in two rings, one ring having three stages, 0, 1, and 2, and the other ring having four stages, 0, 3, 6, and 9 is used to count according to two numeration bases 12 or 10. To switch from duodecimal counter of FIG. 3 to the decimal counter of FIG. 4 all that is required is to provide three switches, the first switch being used to open or close the connection between the input terminal 32 of stage 1 and the negative output terminal of stage 9, the second switch being used to connect the input terminal 31 of stage zero of the second ring to either the output of logical AND circuit 40, or to the output of logical AND circuit 42 and the third switch being used to switch an input of gate 41 from the output line of gate 40 to positive output terminal 29 of the 0 stage of the second ring. These switches may be controlled manually or automatically, for example, by means of a relay. Thus, by use of a simple switching network, the same counter may be used to count according to two numeration systems.

In some cases, it may be desired to modify the ring having stages 0, 1, and 2 so as to obtain a binary counter. To accomplish this, the positive output terminal 29 of stage 2 is connected to input terminal 32 of stage 0; with this connection the only stages which can be switched to the "ON" state are stages 0 and 1. If stage 1 is on the next control pulse into the ring will turn stage 2 on, but the positive output from terminal 29 of stage 2 will turn stage 0 on and the negative output from terminal 28 of stage 0 will in turn reset stage 2. The ring is, therefore, in an unstable condition when stage 2 is on and stage 0 and 1 are off.

Figure 5:
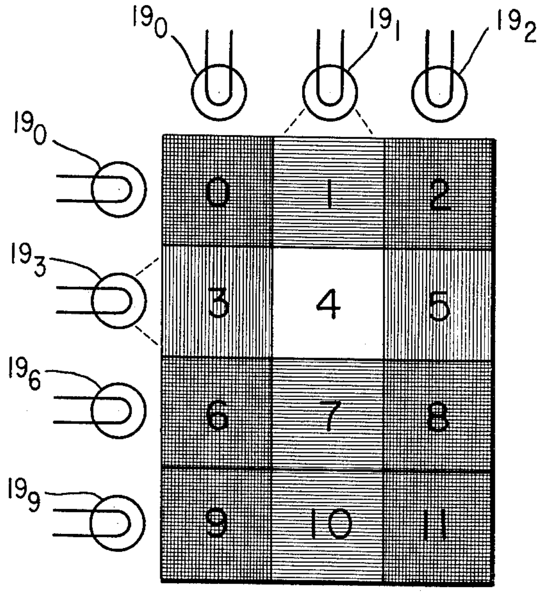
FIG. 5 is a diagrammatic representation of a display device for a counter of the type shown in FIG. 3 or 4.

FIG. 5 shows a simple display system which is particularly well adapted for use to indicate the number being stored in a counter made up of two rings such as those shown in FIGS. 3 and 4. This system comprises a board on which digits 0 to 11 are arranged in three columns of four digits each. Each column and each row has associated therewith a lamp 19 such as that shown in the load circuit of FIG. 1. In FIG. 5, the reference index indicates the stage to which the lamp corresponds. Thus, lamp $\mathbf{19}_1$, corresponds to stage 1 of the first ring, lamps $\mathbf{19}_0$, $\mathbf{19}_1$, $\mathbf{19}_2$ correspond to the first ring, and lamps $\mathbf{19}_0$, $\mathbf{19}_3$, $\mathbf{19}_6$, $\mathbf{19}_9$ to the second ring. When a stage if off, the lamp associated therewith is also off and when the stage is on the lamp is lighted. Each lamp emits a light beam which may be fed through a light duct to lighten the digits associated with the corresponding row or column. Since, as mentioned before, one stage of each ring will be in its "ON" state for each number stored in the counter, one lamp $\mathbf{19}_0$ through $\mathbf{19}_9$ associated with a row and one lamp $\mathbf{19}_0$ through $\mathbf{19}_2$ associated with a column will be lit at all times. Only the digit located at the intersection of the lighted row and the lighted column, i.e., that digit corresponding to the stages that are on in the two rings, will be lighted. All other digits will be kept partially or completely in the shade. In FIG. 5, the display digit is four, corresponding to the lighting of lamps $\mathbf{19}_1$ of stage 1 of the first ring and lamp $\mathbf{19}_3$ of stage 3 of the second ring.

It is possible to modify the structure shown in FIG. 5 by replacing the lamps 19 and the light ducts with lamps having rectilinear filaments which light an entire column or row.

While the invention has been particularly shown and described with reference to preferred embodiments thereof, it will be understood by those skilled in the art that the foregoing and other changes in form and detail may be made therein without departing from the spirit and scope of the invention.

I claim:

1. A two state circuit comprising in combination a pair of bistable magnetic cores, a first pair of serially connected windings wound one on each of said cores and poled so that a current in said windings will drive said cores to the same stable state, a second pair of serially connected windings wound one on each of said cores and poled so that a current in said second pair of windings will drive said cores to opposite stable states, a unidirectional conducting element connected across said second pair of windings, means for continuously impressing an alternating potential on said first pair of windings, said first pair of windings presenting a nearly infinite impedance to said alternating potential when said circuit is in a state designated the "OFF state" with both said cores in the same state and presenting little impedance to said alternating potential when said circuit is in the second state designated the "ON state" with said cores in different stable states; input means adapted to receive signals and to impress said signals on the second pair of windings to control the state of said circuit, signals of a given polarity driving said circuit to its "ON state"; load means connected in series with said first pair of windings, said load means including means for generating an output signal of said given polarity when there is a potential across said load means, and means for feeding said output signal back to said input means to maintain said circuit in its "ON state."

2. A circuit as described in claim 1, characterized by the fact that said load means includes means for generating a signal of polarity other than said given polarity when there is a potential across said load means.

3. A circuit as described in claim 1, characterized by means for generating signals of either polarity and of varying amplitude to be impressed on said input means whereby, by the proper selection of input signal polarity and amplitude, said circuit may be switched to its "OFF state," locked in either its "ON" or it "OFF" state, or switched "ON" in response to any desired logical function.

4. A register circuit comprising in combination a plurality of two-stage devices, each of said devices having a plurality of input means each adapted to switch said device to a first of its states or to hold it in said first state on receiving a pulse of a first polarity and to switch said device to a second of its states or to hold it in said second state on receiving a pulse of the other polarity, and each of said devices having a plurality of output means at least one of which is adapted to give an output of said first polarity when said device is in said first state and at least one other of which is adapted to give an output of said other polarity when said device is in said first state; means for connecting one of said other polarity output means from each device to an input means of each device of the register except the device next succeeding it, the first device of the register being the one next succeeding the last device of the register; means for initially setting one or more of said devices to said first state and all other devices to said second state; means for simultaneously impressing drive signals of said first polarity directly to an input means of each device, whereby the device or devices in said first state will be stepped in ring fashion around said register, and means for deriving an output signal from said register and for resetting it to its initial condition in response to any desired device or combination of devices being in said first state.

5. A pulse counter circuit comprising in combination a plurality of groups of two-stage devices, each of said devices having a plurality of input means each adapted to switch said device to a first of its states or to hold it in said first state on receiving a pulse of a first polarity and to switch said device to the second of its states or to hold it in said second state on receiving a pulse of the other polarity, and each of said devices having a plurality of output means at least one of which is adapted to give an output of said first polarity when said device is in said first state and at least one other of which is adapted to give an output of said other polarity when said device is in said first state; means for connecting one of said other polarity output means from each device of a group to an input means of each other device of the same group except the one next succeeding it, the first device of a group being the one next succeeding the last device of the group; means for initially setting the first device of each group to said first state, means for simultaneously impressing the pulses to be counted on an input means of each device of a first group; first gating means activated by the combined occurrence of a pulse to be counted and the last device of said first group being in said first state to generate a signal of said first polarity, means for applying the output signal from said first gating means to an input of each device of a second group of devices; successive gating means each responsive to the combined occurrence of an output pulse from the gating means associated with the next preceding group of devices and to the last device of its associated group being in said first state for generating an output pulse of said first polarity to be applied to an input means on each device of the next succeeding group; whereby when the number of pulses to be counted reaches any value, one, and only one, device of each group of devices will be in said first state; second gating means responsive to any desired combination of said devices being in said first state for generating an output signal from the counter, and reset means responsive to the same combination of devices being in said first state for setting the devices of each group to their initial condition.

6. A circuit as described in claim 5, characterized by switching means adapted to render said second gating means and said reset means responsive to different combinations of said devices being in said first state.

7. A circuit as described in claim 5, characterized by the use of only two groups of devices, each of said devices including an indicating lamp adapted to be lit when said device is in said first state; means for grouping said lamps with those in one group forming a row and those in the other group forming a column; whereby, for each position of the counter, one lamp from each group will be lit, to give a visual indication of the number then being stored in the counter.

References Cited in the file of this patent

UNITED STATES PATENTS

| | | |
|---|---|---|
| 2,735,021 | Nilssen | Feb. 14, 1956 |
| 2,808,520 | Eckert | Oct. 1, 1957 |
| 2,812,449 | Spencer et al. | Nov. 5, 1957 |
| 2,830,197 | Spencer et al. | Apr. 8, 1958 |
| 2,988,277 | Yamada | June 13, 1961 |

UNITED STATES PATENT OFFICE

CERTIFICATE OF CORRECTION

Patent No. 3,134,025 May 19, 1964

Claude Battarel

It is hereby certified that error appears in the above numbered patent requiring correction and that the said Letters Patent should read as corrected below.

Column 6, line 2, for "x.y" read -- $x.\bar{y}$ --; column 8, line 22, after "until" insert -- after --; column 9, line 65, for "if" read -- is --; column 10, line 54, for "it" read -- its --.

Signed and sealed this 27th day of October 1964.

(SEAL)
Attest:

ERNEST W. SWIDER
Attesting Officer

EDWARD J. BRENNER
Commissioner of Patents